Figure 1:
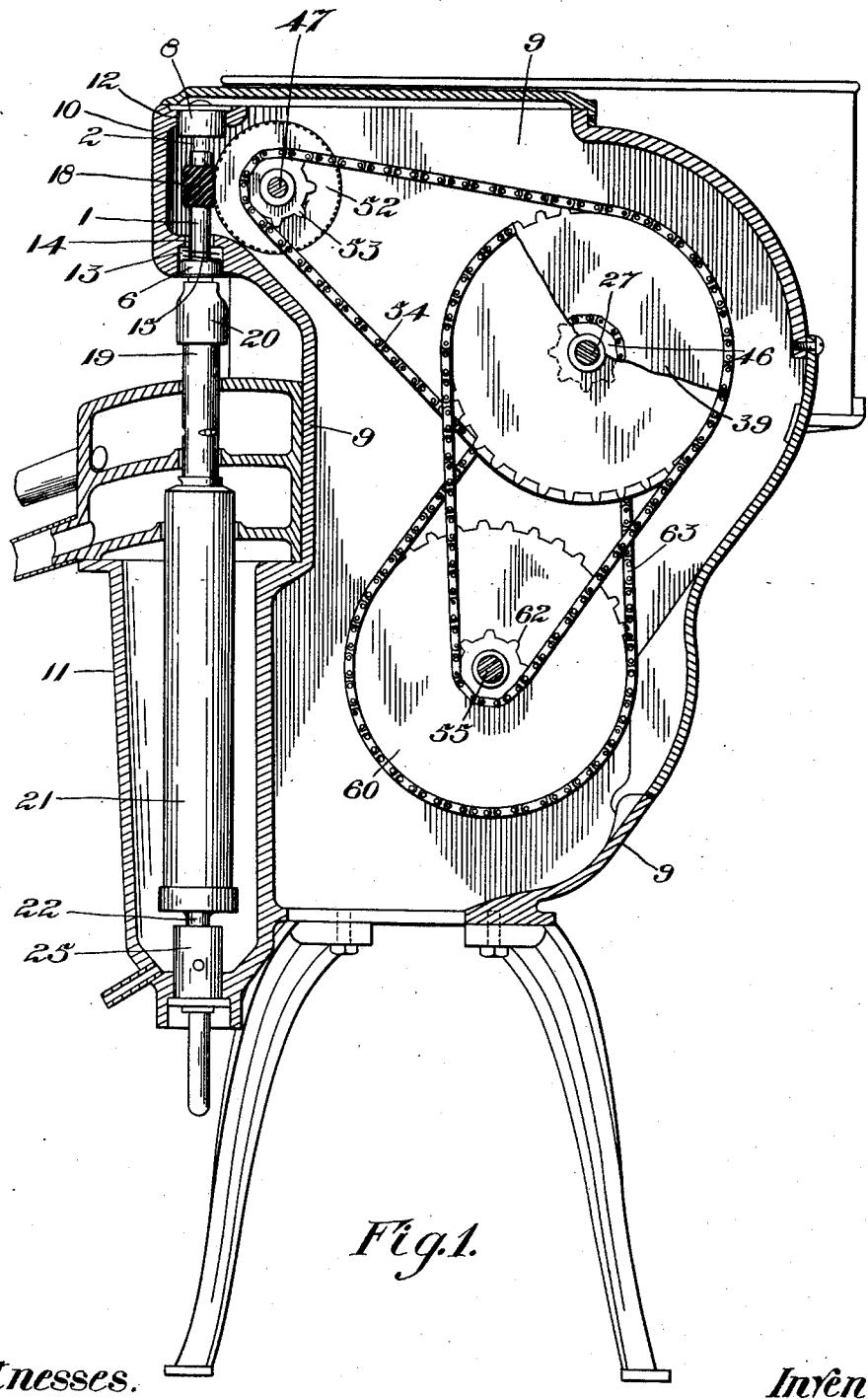

L. A. MacLEAN.
GEARING FOR CREAM SEPARATORS.
APPLICATION FILED AUG. 31, 1908.

998,365.

Patented July 18, 1911.
2 SHEETS—SHEET 1.

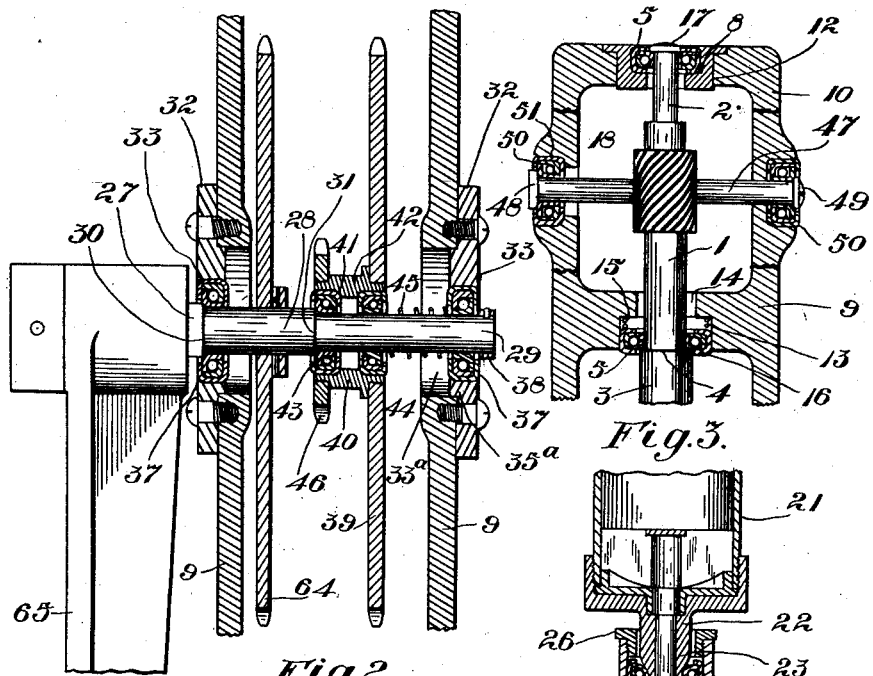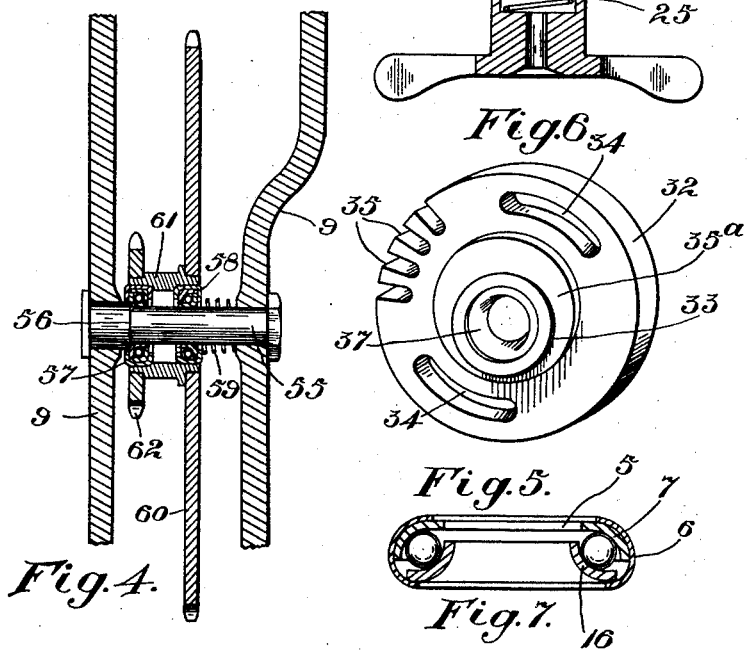

UNITED STATES PATENT OFFICE.

LAUCHLAN ALLAN MacLEAN, OF SARNIA, ONTARIO, CANADA.

GEARING FOR CREAM-SEPARATORS.

998,365.　　　　　　　Specification of Letters Patent.　　Patented July 18, 1911.

Application filed August 31, 1908. Serial No. 451,099.

*To all whom it may concern:*

Be it known that I, LAUCHLAN ALLAN MACLEAN, of the town of Sarnia, in the county of Lambton, in the Province of Ontario, Dominion of Canada, have invented certain new and useful Improvements in Gearing for Cream-Separators; and I do hereby declare that the following is a full, clear, and exact description of the same.

The invention relates to improvements in gearing for cream separators, as described in the following specification and illustrated in the accompanying drawings that form part of the same.

The invention consists essentially in the novel arrangement and construction of parts whereby a bowl spindle and bowl suspended from a rigid ball bearing and steadied by ball bearings spring held upwardly and downwardly are rotated by a chain and sprocket gearing supported on automatically adjustable ball bearings.

The objects of the invention are to lessen the vibration in such machines and thus steady the rising column of milk and cream in the bowl, to increase the speed of the machine without adding to the manual labor required, to simplify the adjustment of the parts, and to provide a machine of cheap and durable construction not liable to get out of order, and in which the parts may be readily replaced as they wear.

In the drawings Figure 1 is a sectional side elevation of the machine. Fig. 2 is a view showing the main driving shaft and the sprocket wheel in section mounted thereon and a portion of the frame in section. Fig. 3 is a view showing the arrangement of the driving spindle and worm wheel spindle and journaling thereof in section. Fig. 4 is a view of the auxiliary shaft and sprocket wheel mounted thereon in section and portions of the frame in section. Fig. 5 is a perspective detail of one of the adjusting disks for supporting the bearings of the main shaft. Fig. 6 is a sectional detail showing the arrangement of the bowl bearings. Fig. 7 is an enlarged sectional detail of the ball bearings.

Like numerals of reference indicate corresponding parts in each figure.

Referring to the drawings 1 is the driving spindle having the reduced upper end 2 and the enlarged lower end 3, the latter forming a shoulder 4.

5 are ball bearings inclosed in circular casings 6 containing the ball races 7, the upper one of said casings being supported in the cup 8, through which the upper reduced end 2 of the spindle 1 extends.

9 is a frame of the machine having the portion 10 over-hanging the bowl receptacle 11, said over-hanging portion 10 having in the top side thereof an opening 12, in which the said cup 8 is supported, and the lower side of the said over-hanging portion having a recess 13 formed on its under side, in which the lower casings 6 are introduced, said lower side of the over-hanging portion 10 also having an orifice 14 opening through the top wall of the recess 13 through which the spindle 1 extends.

15 is a spring introduced between the top wall of the recess 13 and the casing 6 and constantly pressing on said casing, said casing in turn pressing on the ball races, and said balls in turn running on the annular cup 16, the latter encircling the spindle 1 at the shoulder 4. The lower casing 6 extends around and under the cup 16, so that the said casing 6 may be said substantially to contain the said race 7 and the said cup 16 and complete the bearing, as all the bearings throughout the machine are formed in the same manner, the cap on which the balls run in each instance hugging a shaft.

17 is a screw head at the top of the reduced end 2 of the spindle 1 forming a shoulder for the annular cup of the upper bearing.

18 is a worm fixedly mounted on the spindle 1 intermediate of its length.

19 is the bowl spindle operatively connected to the driving spindle 1 by the collar 20.

21 is a bowl having the lower central projection 22 and the shoulder 23 formed in said lower projection.

24 is a bearing of precisely similar formation to the bearings in the spindle 1 having the casing thereof spring-held from the recess in the bearing support 25. The annular cup of said bearing engaging the shoulder 23. 26 is a collar encircling the lower central projection 22 and rigidly secured to the bearing support 25 at the upper end thereof and extending therein and engaging the upper end of the casing 24. 27 is the main driving shaft having the reduced portions 28 and 29 forming the shoulders 30 and 31. 32 are disks having the central holes 33, and the arc-shaped slots 34 eccentrically arranged to the openings 33, and the adjusting tool notches 35 on one side. The disks 32 are secured over suitable openings in the sides of the frame 9 and secured thereto by the cap screws 36, said cap screws being inserted through the arc-shaped slots 34 into correspondingly threaded holes in said frame. 35ª are circular bosses from the inner face of said disks and fitting into the openings, 33ª in the frame, said bosses being concentric with said slots and eccentric to the central holes 33. 37 are bearings of similar formation to the bearings of the said spindle 1 having the cups thereof hugging the shaft 27 at the shoulder 30 and at the collar 38 secured to the shaft, said collar being adjustably secured to said shaft at the end thereof; thus the same arrangement of the ball bearings is arranged for the main shaft, as for the driving spindle. 39 is a sprocket wheel rigid with the hub 40, said hub extending laterally from said sprocket wheel and having in the interior wall thereof the shoulders 41 and 42. 43 and 44 are bearings also of the same formation as the bearings of the spindle 1 having the casing thereof abutting the shoulders 41 and 42 and the cups thereof in one instance abutting the shoulder 31 and in the other instance abutting the spiral spring 45, the latter encircling the main shaft 27 between said cup and the bearing 37. 46 is a sprocket pinion rigid with and mounted at the extremity of the lateral extending portion of the hub 40. The spring 45 between the bearings 43 and 37 keeps the said sprocket wheel and the pinion constantly adjacent to the shoulder 31, thus retaining the bearings in proper adjustment and taking up all wear. 47 is a shaft supported in the sides of the overhanging portion 10 having the solid head 48 and the removable head 49, the said shaft 47 being journaled in bearings 50 of the same formation, already described, and introduced in the recesses 51 in said frame surrounding the shaft openings.

52 is a worm wheel fixedly mounted on the shaft 47 and co-acting with the worm 18.

53 is a sprocket wheel fixedly mounted on the shaft 47 and operatively connected with the sprocket 39 by the chain 54.

55 is a shaft rigidly secured in the sides of the frame 9 below the main shaft 27 and having the shoulder 56 formed thereon adjacent to one side of the frame.

57 and 58 are bearings also of the same general formation described and having the cups thereof, one engaging the shoulder 56 and the other the spiral spring 59, the latter encircling the shaft between the said bearing 58, and the side of the frame and consequently taking up all wear in said bearings.

60 is the sprocket wheel rigid with the hub 61, said hub extending laterally from said wheel and having shoulders in the interior wall thereof into which the casings of the bearings 57 and 58 fit.

62 is a pinion rigid with the hub 61 and mounted at the extremity thereof.

63 is a chain connecting the sprocket pinion 46 and the sprocket 60.

64 is a sprocket wheel fixedly mounted on the main shaft 27 and operatively connected with the pinion 62 and driving said pinion 62 and said sprocket wheel 60 and consequently driving the said pinion 46 and said sprocket wheel 39, which in turn drives the pinion 53 and said worm wheel.

65 is a crank secured to the outer end of the main driving shaft for turning the same.

In the operation of this machine it will be readily seen that by turning the said crank 65, the main driving shaft will be driven, thus rotating the sprocket wheel, 64 fixedly mounted thereon, and this sprocket wheel being connected by a chain to the loosely mounted pinion 62 on the rigidly secured shaft, the sprocket wheel 60 on the same hub is also turned and the latter sprocket wheel 60 being connected back to the loosely mounted pinion 46 on the main shaft, the latter is turned being on the same hub as the loosely mounted sprocket wheel 39, therefore the said sprocket wheel 39 is rotated. The loosely mounted sprocket wheel 39 on the main shaft is, as explained, connected by a chain with the pinion on the worm wheel shaft consequently the said worm wheel is rotated, turning the worm and the driving spindle and bowl.

The disks supporting the main shaft bearings are adjusted by loosening the cap screws securing the same to the frame, and inserting a tool between the notches and turning the disk and as the said disk turns, the boss from the inner face thereof and projecting into the circular hole in the frame, throws the bearing to one side or the other, or moves it downwardly or upwardly as the case may be according as the particular adjustment is required.

The bearings supporting the main shaft may be adjusted by adjusting the collar 38 on the end thereof. These bearings when once adjusted do not, however, readily get out of adjustment. The bearings of the hub 40 supporting the pair of sprocket wheels on the main shaft have considerable more wear and any wear occurring therein is automatically taken up by the spring 45 which holds the outer bearing 44 up to its work, the other or inner bearing 43 being held against the shoulder on the shaft. The bearings supporting the hub 61 on the shaft 55 are adjusted in a like manner to those on the main shaft.

In the operation of cream separators, the bowl is very apt to vibrate or jump even against its extreme weight and in the present invention the bowl is suspended from a rigid ball bearing and steadied at the bottom by an upwardly spring held ball bearing which prevents oscillation or lateral movement and the said bowl and its driving spindle are steadied and held from jumping by a ball bearing encircling the driving spindle and spring held in a downward direction. The combined effect of the upwardly and downwardly spring held bearings with the rigid suspension bearing is to maintain a very smooth running bowl and consequently the separation of the cream from the milk is greatly facilitated.

What I claim as my invention is:—

1. In gearing for cream separators, a frame, a main shaft extending across and beyond said frame, journal bearings for said main shaft adjustably supported in the sides of said frame, a sprocket wheel fixedly mounted on said main shaft, a fixed shaft supported by said frame, a sprocket pinion loosely mounted on said fixed shaft, a sprocket wheel loosely mounted on said fixed shaft and rigidly connected to said loosely mounted pinion, a chain operatively connecting said main shaft sprocket and said fixed shaft pinion, a sprocket pinion loosely mounted on said main shaft, a sprocket wheel loosely mounted on said main shaft and rigidly connected to said loosely mounted pinion, a chain operatively connecting said fixed shaft sprocket wheel with said main shaft pinion, an auxiliary shaft, a bearing in said frame for said auxiliary shaft, a sprocket fixedly mounted on said auxiliary shaft, a chain operatively connecting the loose sprocket wheel on said main shaft with the auxiliary shaft sprocket, vertical bearings in said frame, a bowl spindle journaled in said vertical bearings, and means operatively connecting said auxiliary shaft with said bowl spindle.

2. In a cream separator, a frame having a pair of journal bearings adjustably supported in the opposite sides thereof, a main shaft journaled in said bearings, a sprocket wheel fixedly mounted on said main shaft, a pair of sprocket wheels secured together and rotatably mounted on said main shaft, a shaft fixedly secured in the side walls of said frame below said main shaft, a pair of sprocket wheels fixedly secured together and rotatably mounted on said fixed shaft, a sprocket chain operatively connecting one of the sprocket wheels of the latter pair with the fixed sprocket wheel on said main shaft, a sprocket chain connecting the other of the pair of sprocket wheels mounted on said fixed shaft with one of the pair of sprocket wheels rotatably mounted on said main shaft, a shaft rotatably supported in said frame, a sprocket wheel fixedly secured to the latter shaft, a sprocket chain operatively connecting the sprocket on the latter shaft with the other sprocket wheel of the pair rotatably mounted on said main shaft, journal bearings adjustably supported in vertical alinement in said frame, a bowl spindle journaled in the latter bearings and having a worm fixedly secured thereto, and a worm wheel fixedly secured to the latter rotatable shaft supported in said frame and operatively engaging said worm.

3. In a cream separator, a frame having a pair of circular orifices arranged in the opposite sides and in horizontal alinement, a pair of disks having central circular bosses extending from one face thereof and adapted to fit into the circular orifices in said frame and circular orifices arranged in eccentric relation to said bosses and extending through said disks and circumferential slots in the outer flanged portions, screws extending through the slots in said disks and threaded into said frame and holding said disks securely to said frame, journal bearings fixedly secured in the eccentrically arranged circular orifices in said disks, a main shaft journaled in said bearings, a pair of sprockets fixedly secured together and rotatably mounted on said main shaft, a shaft fixedly secured in said frame below said main shaft, a pair of sprockets fixedly secured together and mounted on said fixed shaft, a sprocket chain connecting the fixed sprocket wheel on said main shaft with one of the pair of sprocket wheels mounted on said fixed shaft, a sprocket chain connecting the other sprocket wheel of the pair on said fixed shaft with one of the pair rotatably mounted on said main shaft, journal bearings arranged in vertical alinement in said frame, a bowl spindle journaled in said vertically arranged bearings, and means operatively connected with the other of the pair of sprockets journaled on said main shaft for operating said bowl spindle.

4. In gearing for cream separators, a frame, a pair of brackets adjustably secured to the sides of said frame having shaft orifices therethrough, ball bearings in said shaft orifices, a main shaft journaled in said bearings having reduced end portions, a sprocket wheel fixedly mounted on said main shaft, a fixed shaft supported by said frame, a sprocket pinion loosely mounted on said fixed shaft, a sprocket wheel loosely mounted on said fixed shaft and rigidly connected to said sprocket pinion, a chain connecting said fixed sprocket on said main shaft, with the sprocket pinion in said fixed shaft, a sleeve encircling the reduced portion of said main shaft, a ball bearing member encircling said shaft between one end of said sleeve and said shaft at the shoulder formed by said reduced portion, a ball bearing member between said sleeve and said shaft intermediate of the length of said reduced portion and slidably arranged thereon, a sprocket pinion fixedly mounted on said sleeve, a sprocket wheel rigidly mounted on said sleeve, a spiral spring encircling said shaft and bearing against the slidable ball bearing member, a chain connected with the loose sprocket wheel on the fixed shaft with the sleeve pinion, vertical bearings in said frame, a bowl spindle journaled in said vertical bearings, an auxiliary shaft, bearings for said auxiliary shaft supported by said frame, a chain operatively connecting said sleeve sprocket wheel with said auxiliary shaft, and means operatively connecting said auxiliary shaft and said bowl spindle.

5. In gearing for cream separators, a frame, a main shaft, bearings for said main shaft supported by said frame, an auxiliary shaft, bearings for said auxiliary shaft supported by said frame, a fixed shaft supported by said frame, a loose wheel mounted on said fixed shaft, a fixed wheel on said main shaft operating said loose wheel, a loose wheel on said main shaft operated by said loose wheel on said fixed shaft, a fixed wheel on said auxiliary shaft operated by said loose wheel on said main shaft, a fixed vertical upper bearing supported by said frame, a loosely supported vertical bearing in vertical alinement below the aforesaid vertical bearing, a bowl spindle journaled in said bearings and having a reduced lower end extending into the lower bearing, a spring bearing downwardly on said lower bearing, and means operatively connecting said auxiliary shaft and said bowl spindle.

Signed at Port Hudson, Michigan, this 24th day of August, 1908.

LAUCHLAN ALLAN MacLEAN.

Witnesses:
SHIRLEY STEWART,
KATHRYN PFANNER.

---

Copies of this patent may be obtained for five cents each, by addressing the "Commissioner of Patents, Washington, D. C."